US012637013B2

(12) United States Patent
    Stephan

(10) Patent No.:    US 12,637,013 B2
(45) Date of Patent:        May 26, 2026

(54) CENTER CONSOLE AND FRONT SEAT ASSEMBLY FOR A VEHICLE

(71) Applicant: Ford Global Technologies, LLC, Dearborn, MI (US)

(72) Inventor: Joerg Stephan, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 404 days.

(21) Appl. No.: 18/466,459

(22) Filed: Sep. 13, 2023

(65) Prior Publication Data

US 2024/0101037 A1     Mar. 28, 2024

(30) Foreign Application Priority Data

Sep. 28, 2022    (DE) .......................... 102022124907.7

(51) Int. Cl.
    *B60R 7/04*        (2006.01)
    *B60N 3/00*        (2006.01)
    *B60N 3/10*        (2006.01)
    *B60R 16/03*        (2006.01)

(52) U.S. Cl.
    CPC ................ *B60R 7/04* (2013.01); *B60N 3/001* (2013.01); *B60N 3/101* (2013.01); *B60R 16/03* (2013.01)

(58) Field of Classification Search
    CPC .......... B60R 7/04; B65D 43/20; B60N 3/102; B60N 3/001; B60N 3/002; B60N 2/754; B60N 2/767
    See application file for complete search history.

(56) References Cited

U.S. PATENT DOCUMENTS

| | | | | |
|---|---|---|---|---|
| 5,085,481 | A * | 2/1992 | Fluharty ................... | B60R 7/04 296/37.14 |
| 6,435,587 | B1 * | 8/2002 | Flowerday ............... | B60N 3/08 220/345.5 |
| 7,104,580 | B2 * | 9/2006 | Clark ...................... | B60N 2/793 296/24.32 |
| 10,709,249 | B2 | 7/2020 | Liu et al. | |
| 2002/0175531 | A1 * | 11/2002 | Worrell .................. | B60N 2/793 296/65.03 |
| 2005/0248169 | A1 * | 11/2005 | Clark ...................... | B60N 3/101 296/24.34 |
| 2010/0090491 | A1 * | 4/2010 | Hipshier .................. | B60R 7/04 296/24.34 |
| 2010/0314896 | A1 | 12/2010 | Skibinski et al. | |
| 2012/0088444 | A1 * | 4/2012 | Wittorf ............. | B60H 1/00564 454/142 |

(Continued)

FOREIGN PATENT DOCUMENTS

| | | |
|---|---|---|
| CN | 213705335 U | 7/2021 |
| DE | 102004003251 A1 | 8/2005 |

(Continued)

*Primary Examiner* — Daniel J Colilla
(74) *Attorney, Agent, or Firm* — Vichit Chea; Price Heneveld LLP

(57) ABSTRACT

A center console for a vehicle has a storage trough, which extends over at least a predominant part of a length of the center console, and a storage container, which is insertable into the storage trough and which has an upper entrance opening. In order to provide a center console and front seat assembly for a vehicle that are individually configurable in terms of their characteristics, the storage container has a roller shutter for closing the entrance opening.

9 Claims, 2 Drawing Sheets

(56)                    References Cited

U.S. PATENT DOCUMENTS

2020/0231077  A1 *   7/2020   Schnur ................... B60N 3/101
2020/0406823  A1 *   12/2020  An ......................... B60N 2/773

FOREIGN PATENT DOCUMENTS

DE        102009055834  A1      6/2011
DE        102010047626  A1      4/2012
DE            10321837  B4      3/2014
DE        102017211229  A1      1/2019
JP          2011001079  A   *   1/2011
WO      WO-2006084968  A2  *   8/2006   ............. B60N 2/753

* cited by examiner

CENTER CONSOLE AND FRONT SEAT ASSEMBLY FOR A VEHICLE

CROSS REFERENCE TO RELATED APPLICATION(S)

This application claims foreign priority benefits under 35 U.S.C. § 119(a)-(d) to German Application No. 102022124907.7 filed Sep. 28, 2022, which is hereby incorporated by reference in its entirety.

FIELD OF THE DISCLOSURE

The present disclosure generally relates to a center console for a vehicle, and more particularly relates to a vehicle center console having a storage trough, which extends over at least a predominant part of a length of the center console, and a storage container, which is insertable into the storage trough and which has an upper entrance opening, and also relates to a front seat assembly for a vehicle, having at least one front seat and a center console that runs alongside the front seat.

BACKGROUND OF THE DISCLOSURE

Motor vehicles are commonly equipped with a center console which typically extends rearwardly from a knee region between two front footwells as far as between two front seats. Such center consoles can take a wide variety of forms, and normally have at least one functional unit, for example a beverage holder or the like.

It would be desirable to provide for a center console and front seat assembly for a vehicle that are individually configurable in terms of the characteristics.

SUMMARY OF THE DISCLOSURE

According to a first aspect of the present disclosure, a center console for a vehicle includes a storage trough which extends over at least a predominant part of a length of the center console, and a storage container configured to be insertable into the storage trough and which has an upper entrance opening. The storage container has a roller shutter for closing the entrance opening.

Embodiments of the first aspect of the present disclosure can include any one or a combination of the following features:

the storage container has a lower part and an upper part arranged longitudinally movably on the lower part and on which the roller shutter is arranged;

the upper part is linearly movable between a forward closed position, in which the upper part closes the lower part when the roller shutter is in a closed position;

the upper part is linearly movable in a rearward opening position, in which the upper part is at least partially rearwardly offset in relation to the lower part;

the storage container has a table element which is situated transversely movably on a rearward end of an upper part and which is linearly movable between a rest position, in which the table element is at least partially concealed in and/or on the upper part, and a table position, in which the table element is at least predominantly laterally offset in relation to the upper part;

the storage container has two table elements which are transversely movable in opposite directions; and the center console further includes a forward table portion and a beverage holder, an induction charging unit and a stowage compartment arranged on the forward table portion.

According to a second aspect of the present disclosure, a center console includes a storage trough which extends over at least a predominant part of a length of the center console, and a forward table portion and at least one of a beverage holder, an induction charging unit and a stowage compartment arranged on the forward table portion, and a storage container configured to be insertable into the storage trough and which has an upper entrance opening. The storage container has at least one roller shutter for closing the entrance opening. The storage container has a lower part and an upper part arranged longitudinally movably on the lower part and on which the roller shutter is arranged. The upper part is linearly movable between a forward closed position, in which the upper part closes the lower part when the roller shutter is in a closed position. The storage container further has a rearward opening position, in which the upper part is at least partially rearwardly offset in relation to the lower part.

Embodiments of the second aspect of the present disclosure can include any one or a combination of the following features:

the storage container has a table element which is situated transversely movably on a rearward end of an upper part and which is linearly movable between a rest position, in which the table element is at least partially concealed in and/or on the upper part, and a table position, in which the table element is at least predominantly laterally offset in relation to the upper part; and the storage container has two table elements which are transversely movable in opposite directions.

According to a third aspect of the present disclosure, a front seat assembly for a vehicle includes a front seat, and a center console that runs alongside the front seat. The center console includes a storage trough which extends over at least a predominant part of a length of the center console, and a storage container configured to be insertable into the storage trough and which has an upper entrance opening. The storage container has a roller shutter for closing the entrance opening.

Embodiments of the third aspect of the present disclosure can include any one or a combination of the following features:

a table element, when in its table position, is at least partially rearwardly offset in relation to the front seat;

a storage container has two table elements which are transversely movable in opposite directions;

the front seat has, on its side facing toward the center console, an armrest that is pivotable about a horizontal axis between a horizontal armrest position, in which the armrest is arranged at least partially over a rearward portion of the center console, and a vertical opening position, in which the armrest is not arranged over the center console;

the storage container has a lower part and an upper part arranged longitudinally movably on the lower part and on which the roller shutter is arranged;

the upper part is linearly movable between a forward closed position, in which the upper part closes the lower part when the roller shutter is in a closed position;

the upper part is linearly movable in a rearward opening position, in which the upper part is at least partially rearwardly offset in relation to the lower part; and a forward table portion and a beverage holder, an induction charging unit and a stowage compartment arranged on the forward table portion.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figures 1A, 1B, 1C, 1D:
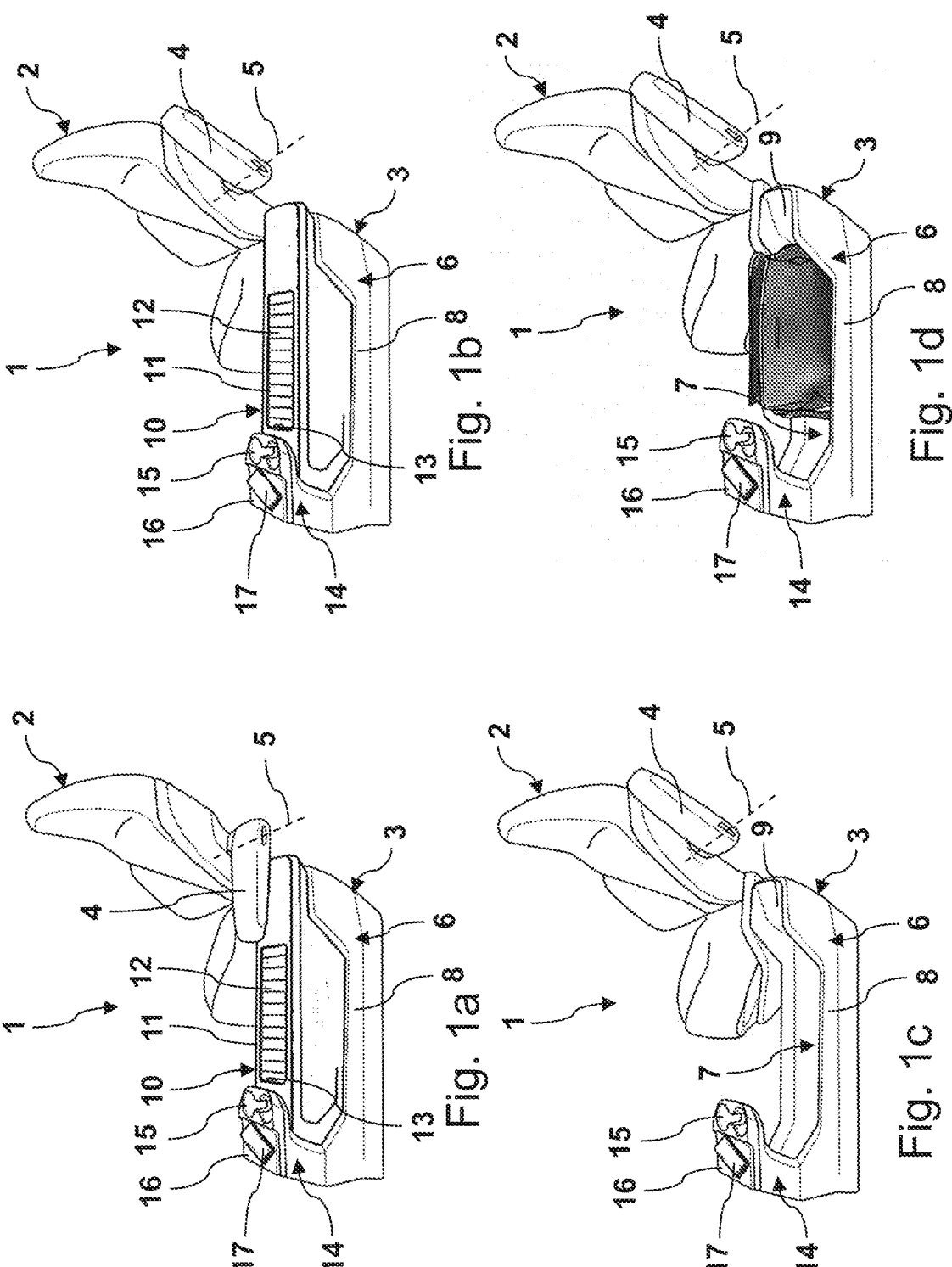
FIG. 1a is a schematic and perspective illustration of an exemplary embodiment of a front seat assembly having a center console for a vehicle in a first state.
FIG. 1b is a schematic and perspective illustration of the front seat assembly shown in FIG. 1a in a second state.
FIG. 1c is a schematic and perspective illustration of the front seat assembly shown in FIG. 1a in a third state.
FIG. 1d is a schematic and perspective illustration of a front seat assembly shown in FIG. 1a in a fourth state.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a center console and front seat assembly for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In the various figures, identical parts are always denoted by the same reference designations, for which reason the parts may generally also be described once.

FIGS. 1a-1d are schematic and perspective illustrations of an exemplary embodiment of a front seat assembly 1 for a vehicle having a center console 3 in different states. The front seat assembly 1 has a front seat 2 and has the center console 3 running alongside the front seat 2.

The front seat 2 has, on its side facing toward the center console 3, an armrest 4 that is pivotable about a horizontal axis 5 between a horizontal armrest position shown in FIG. 1a, in which the armrest 4 is arranged partially over a rearward portion of the center console 3, and a vertical opening position shown in FIGS. 1b-1d, in which the armrest 4 is not arranged over the center console 3. For the sake of clarity, a further front seat is not illustrated. The center console 3 is arranged between the two front seats. It would self-evidently also be possible for an armrest 4 to be arranged on the further front seat.

The center console 3 has a storage trough 6 which extends over at least a predominant part of a length of the center console 3 and which provides a storage space 7 that is shown in FIG. 1c. The storage trough 6 has side walls 8 which have a reduced height in the middle region of the center console 3. The storage trough 6 furthermore has a rearward end wall 9 and a forward end wall (not shown).

The center console 3 furthermore has a storage container 10 which is inserted or insertable into the storage trough 6 and which has an upper entrance opening 11. An external shape of the storage container 10 is adapted to the storage space 7 of the storage trough 6, such that the storage container 10 can be inserted without play into the storage trough 6. The storage container 10 furthermore has a roller shutter 12 for closing the entrance opening 11, the roller shutter being shown in its closed position in FIGS. 1a and 1b, and an actuating element 13 for the manual actuation of the roller shutter 12. The roller shutter 12 has horizontal slats hinged together and may be configured as a tambour door, for example.

In the state illustrated in FIG. 1c, the storage container 10 has been removed from the storage trough 6. Here, the armrest 4 has preferably first been pivoted into its opening position, as shown in FIG. 1b. The storage container 10 can preferably be inserted into or removed from the storage trough 6 without the use of tools. When the storage container 10 has been removed from the storage trough 6, the storage container 10 can be stored in the vehicle at some other location, for example in a receptacle provided for same. The storage trough 6, that is to say the storage space 7, can then be used to efficiently store other articles such as bags or the like, as shown by way of example in FIG. 1d. The armrest 4 could also be pivoted back into its armrest position.

The center console 3 furthermore has a forward table portion 14, on which two beverage holders 15 and an induction charging unit 16, on which a smartphone 17 can be placed, are arranged. The induction charging unit 16 may be configured to inductively charge batteries in one or more electric-powered devices.

Figures 2A, 2B, 2C:
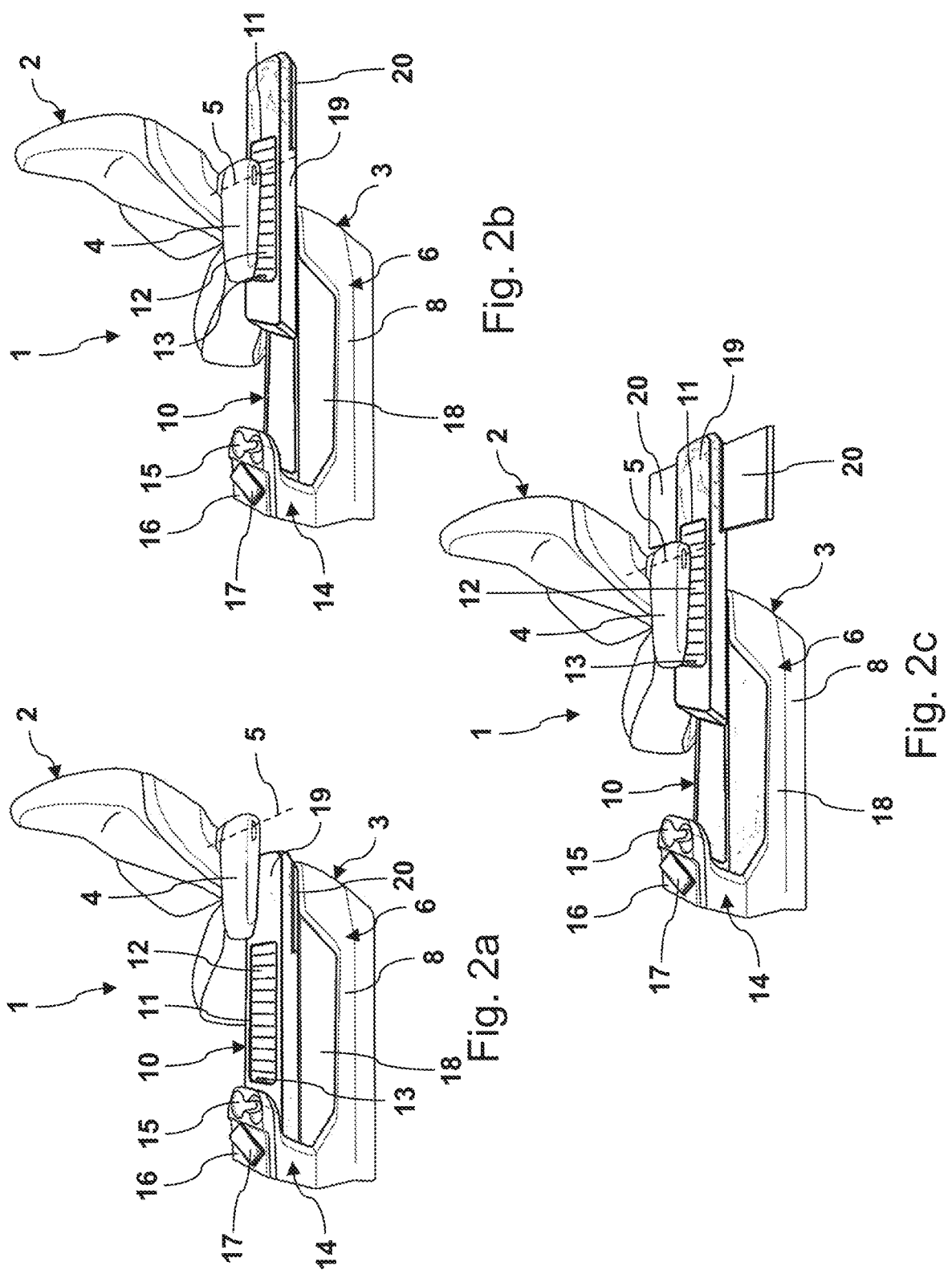
FIG. 2a is a schematic and perspective illustration of a further exemplary embodiment of a front seat assembly having a center console for a vehicle in a first state.
FIG. 2b is a schematic and perspective illustration of the front seat assembly shown in FIG. 2a in a second state.
FIG. 2c is a schematic and perspective illustration of the front seat assembly shown in FIG. 2a in a third state.

FIGS. 2a-2c are schematic and perspective illustrations of a further exemplary embodiment of a front seat assembly 1 for a vehicle having a center console shown in different states. The front seat assembly 1 has the front seat 2 and has the center console 3 running alongside the front seat 2.

The front seat 2 has, on its side facing toward the center console 3, the armrest 4 that is pivotable about a horizontal axis 5 between a horizontal armrest position shown in FIGS. 2a-2c, in which the armrest 4 is arranged partially over a rearward portion of the center console 3, and a vertical opening position (not shown), in which the armrest 4 is not arranged over the center console 3. The vertical opening position corresponds to the position shown in FIGS. 1b-1d.

The center console 3 has the storage trough 6 which extends over at least a predominant part of a length of the center console 3 and which is configured correspondingly to the exemplary embodiment shown in FIGS. 1a-1d. The storage trough 6 has side walls 8 which have a reduced height in the middle region of the center console 3. The storage trough 6 furthermore has a rearward end wall (not shown) and a forward end wall (not shown).

The center console 3 furthermore has the storage container 10 which is inserted or insertable into the storage trough 6 and which has the upper entrance opening 11. An external shape of the storage container 10 is adapted to a storage space (not shown) of the storage trough 6, such that the storage container 10 can be inserted without play into the storage trough 6. The storage container 10 furthermore has the roller shutter 12 for closing the entrance opening 11, the roller shutter 12 being shown in its closed position in FIGS. 2a-2c, and an actuating element 13 for the manual actuation of the roller shutter 12.

The storage container 10 according to the exemplary embodiment in FIGS. 2a-2c has a lower part 18 and has an upper part 19 which is arranged longitudinally movably on the lower part 18 and on which the roller 12 is arranged. The upper part 19 is linearly movable between a forward closed position shown in FIG. 2a, in which the upper part 19 closes the lower part 18 when the roller shutter 12 is in its closed position, and a rearward opening position shown in FIGS. 2b and 2c, in which the upper part 19 is partially rearwardly offset in relation to the lower part 18.

The storage container 10 furthermore has two table elements 20 which are situated, so as to be transversely movable in opposite directions, on a rearward end of the upper part 19 and which are each linearly movable between a rest position shown in FIGS. 2a and 2b, in which the table element 20 is at least partially concealed in and/or on the upper part 19, and a table position shown in FIG. 2c, in which the relevant table element 20 is at least predominantly laterally offset in relation to the upper part 19. The relevant table element 20, when in its table position, is partially rearwardly offset in relation to the front seat 2.

The center console 3 furthermore has a forward table portion 14, on which two beverage holders 15 and an induction charging unit 16, on which a smartphone 17 can be placed, are arranged.

According to the disclosure, a center console for a vehicle is provided having a storage container which has at least one roller shutter for closing the entrance opening.

The features and measures individually specified in the description may be combined with one another in any technically meaningful way and reveal further embodiments of the center console and front seat assembly. The description additionally characterizes and specifies the center console and front seat assembly, in particular in conjunction with the figures.

According to the disclosure, the center console can be equipped with the storage container when required by virtue of the storage container being inserted into the storage trough, preferably without the use of tools. Here, the storage container may for example be received form-fittingly in the storage trough. Alternatively or in addition, at least one clamping mechanism or detent mechanism may be provided, to fasten the storage container on or in the storage trough. When no storage container is required, it can be removed again from the storage trough, preferably without the use of tools, such that the storage trough is available for receiving other articles. The storage container, when removed from the center console, can then, for example, be stowed elsewhere in the vehicle. The center console can thus be varied or configured in terms of its construction in accordance with user requirements. The storage container may be portable and be carried outside the vehicle by a person.

The upper entrance opening of the storage container can be closed by use of the roller shutter. In this way, articles can be hidden in the storage container in the vehicle, for example so as not to be visible from outside the vehicle in order to protect against theft. The roller shutter may be configured such that, when in its closed state in which it completely closes the upper entrance opening of the storage container, the roller shutter forms a shelf in the center console on which articles can be placed. The roller shutter thus expediently has a dual function.

The storage trough may be upwardly open over the predominant part or the entirety of its length. The storage trough may have longitudinally extending side walls and transversely extending end walls. The side walls may have a reduced height in a middle region.

The center console may in particular be installed in a vehicle in the form of a motor vehicle, for example a passenger motor vehicle or utility motor vehicle. Such a vehicle therefore constitutes a further aspect according to the disclosure.

In one advantageous embodiment, the storage container has a lower part and an upper part which is arranged longitudinally movably on the lower part and on which the roller shutter is arranged, wherein the upper part is linearly movable between a forward closed position, in which the upper part closes the lower part when the roller shutter is in a closed position, and a rearward opening position, in which the upper part is at least partially rearwardly offset in relation to the lower part. As a result of the upper part being moved into its rearward opening position, the lower part can be made substantially or entirely accessible from above, for example for the purposes of inserting an article into the storage container, the size of which article prevents it from being inserted into the storage container via the upper entrance opening thereof. The expressions "rearward" and "forward" relate to a vehicle in which the center console is installed, such that the center console has in particular a forward end and a rearward end. The expression "longitudinally movable" means that the upper part is arranged on the lower part so as to be movable in the longitudinal direction of the center console. For the longitudinal movement of the upper part, a rail guide may be formed between the upper part and the lower part.

In a further advantageous embodiment, the storage container has at least one table element which is situated transversely movably on a rearward end of an upper part and which is linearly movable between a rest position, in which the table element is at least partially concealed in and/or on the upper part, and a table position, in which the table element is at least predominantly laterally offset in relation to the upper part. The table element can be used to provide a table surface rearward of the storage trough, in particular for the rear row of seats of the vehicle. When the table element is required, the upper part is first moved longitudinally into its rearward opening position, and the table element is subsequently moved transversely into its table position. The expression "transversely movable" means that the table element is arranged on the upper part so as to be movable transversely with respect to the longitudinal direction of the center console.

In a further advantageous embodiment, the storage container has two table elements which are transversely movable in opposite directions. In this way, a larger table surface can be provided for the rear row of seats, in particular to both sides of the center console.

In a further advantageous embodiment, the center console has at least one forward table portion on which at least one beverage holder and/or at least one induction charging unit and/or at least one stowage compartment are or is arranged. The forward table portion may be elevated and extend over a portion of the storage trough. The table portion may be designed to hold the storage container that has been inserted into the storage trough. The table portion may have one or more beverage holders or alternatively one or more induction charging units or alternatively one or more stowage compartments. Alternatively, the table portion may have at least one beverage holder and at least one induction charging unit or alternatively at least one beverage holder and at least one stowage compartment or alternatively at least one induction charging unit and at least one stowage compartment. The induction charging unit allows wireless charging of a mobile radio terminal, for example.

A front seat assembly is also provided having the center console of which is designed according to any one of the aforementioned features or a combination of at least two of the features. The advantages mentioned above with regard to the center console are correspondingly associated with the front seat assembly. Since the at least one table element, when in its table position, is partially or entirely rearwardly offset in relation to the front seat, a table surface for the rear row of seats of the vehicle can be temporarily provided when required.

In a further embodiment, the front seat has, on its side facing toward the center console, an armrest that is pivotable about a horizontal axis between a horizontal armrest position, in which the armrest is arranged at least partially over a rearward portion of the center console, and a vertical opening position, in which the armrest is not arranged over the center console. It may be provided here that the armrest must be pivoted into its vertical opening position in order to enable the storage container to be inserted into the storage trough and removed from the storage trough.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A center console for a vehicle, the center console comprising:

a storage trough which extends over at least a predominant part of a length of the center console; and a storage container configured to be insertable into the storage trough and which has an upper entrance opening, wherein the storage container has a roller shutter for closing the entrance opening, wherein the storage container has a lower part and an upper part arranged longitudinally movably on the lower part and on which the roller shutter is arranged, wherein the upper part is linearly movable between a forward closed position, in which the upper part closes the lower part when the roller shutter is in a closed position, and a rearward opening position, in which the upper part is at least partially rearwardly offset in relation to the lower part, and wherein the storage container has a table element which is situated transversely movably on a rearward end of the upper part and which is linearly movable between a rest position, in which the table element is at least partially concealed in and/or on the upper part, and a table position, in which the table element is at least predominantly laterally offset in relation to the upper part.

2. The center console according to claim 1, wherein the storage container has two table elements which are transversely movable in opposite directions.

3. The center console according to claim 1, further comprising a forward table portion and at least one of a beverage holder, an induction charging unit and a stowage compartment arranged on the forward table portion.

4. A center console for a vehicle, the center console comprising:

a storage trough which extends over at least a predominant part of a length of the center console;

a forward table portion and at least one of a beverage holder, an induction charging unit and a stowage compartment arranged on the forward table portion; and a storage container configured to be insertable into the storage trough and which has an upper entrance opening, wherein the storage container has a roller shutter for closing the entrance opening, wherein the storage container has a lower part and an upper part arranged longitudinally movably on the lower part and on which the roller shutter is arranged, wherein the upper part is linearly movable between a forward closed position, in which the upper part closes the lower part when the roller shutter is in a closed position, and a rearward opening position, in which the upper part is at least partially rearwardly offset in relation to the lower part, wherein the storage container has a table element which is situated transversely movably on a rearward end of the upper part and which is linearly movable between a rest position, in which the table element is at least partially concealed in and/or on the upper part, and a table position, in which the table element is at least predominantly laterally offset in relation to the upper part.

5. The center console according to claim 4, wherein the storage container has two table elements which are transversely movable in opposite directions.

6. A front seat assembly for a vehicle, the front seat assembly comprising:

a front seat; and a center console that runs alongside the front seat, the center console comprising:

a storage trough which extends over at least a predominant part of a length of the center console; and a storage container configured to be insertable into the storage trough and which has an upper entrance opening, wherein the storage container has a roller shutter for closing the entrance opening, wherein the storage container has a lower part and an upper part arranged longitudinally movably on the lower part and on which the roller shutter is arranged, wherein the upper part is linearly movable between a forward closed position, in which the upper part closes the lower part when the roller shutter is in a closed position, and a rearward opening position, in which the upper part is at least partially rearwardly offset in relation to the lower part, and wherein the storage container has a table element which is situated transversely movably on a rearward end of an upper part and which is linearly movable between a rest position, in which the table element is at least partially concealed in and/or on the upper part, and a table position, in which the table element is at least predominantly laterally offset in relation to the upper part.

7. The front seat assembly according to claim 6, wherein the storage container has two table elements which are transversely movable in opposite directions.

8. The front seat assembly according to claim 6, wherein the front seat has, on a side facing toward the center console, an armrest that is pivotable about a horizontal axis between a horizontal armrest position, in which the armrest is arranged at least partially over a rearward portion of the center console, and a vertical opening position, in which the armrest is not arranged over the center console.

9. The front seat assembly according to claim 6, further comprising a forward table portion and at least one of a beverage holder, an induction charging unit and a stowage compartment arranged on the forward table portion.

* * * * *